No. 665,231. Patented Jan. 1, 1901.
H. E. KOCH.
GRAIN DISLODGER.
(Application filed Aug. 25, 1900.)
(No Model.)

WITNESSES:
C. D. Rollins
H. L. Sherwood

INVENTOR
H. E. Koch.
BY
Chas. Garrett
ATTORNEY

UNITED STATES PATENT OFFICE.

HENRY E. KOCH, OF HARTINGTON, NEBRASKA.

GRAIN-DISLODGER.

SPECIFICATION forming part of Letters Patent No. 665,231, dated January 1, 1901.

Application filed August 25, 1900. Serial No. 28,021. (No model.)

*To all whom it may concern:*

Be it known that I, HENRY E. KOCH, a citizen of the United States, residing at Hartington, in the county of Cedar and State of Nebraska, have invented certain new and useful Improvements in Grain-Dislodgers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to grain-harvesters, and has particular reference to means for raising fallen grain and supporting it in a position most suitable for cutting.

The accompanying drawings illustrate the invention, in which—

Figure 1:
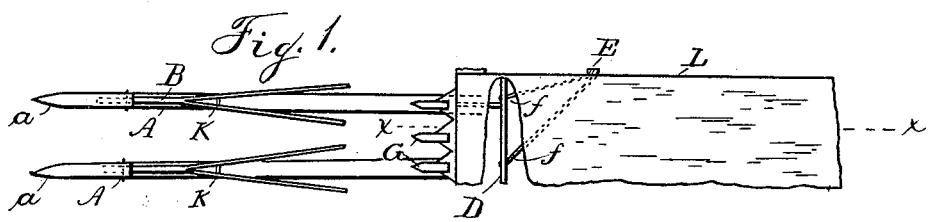
Figure 2:
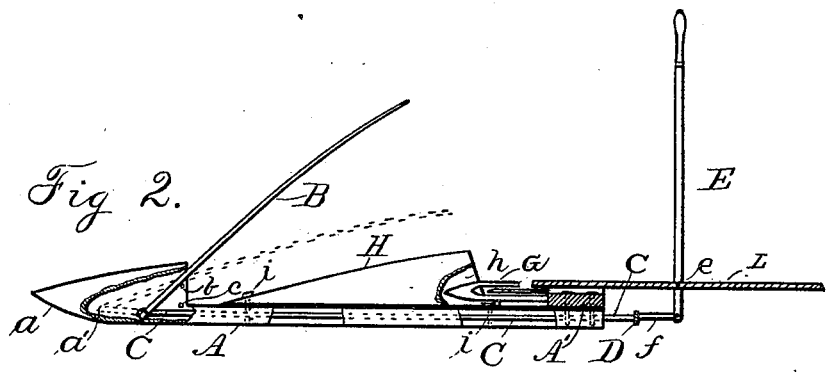
Figure 3:
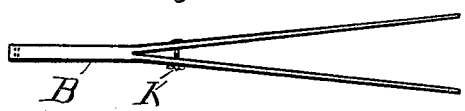

Figure 1 is a plan of part of a reaper and of my invention without the auxiliary fender attached thereto. Fig. 2 is a vertical side view of the invention, partly in section, taken on line $x \, x$ of Fig. 1; and Fig. 3 is a plan of the bifurcated fender.

Similar letters denote corresponding parts in the several views.

The letter A indicates the runner of my grain-dislodger. It is bolted to the under side of the finger-bar A' and extends forward beneath and beyond the guards G. The point $a$ of the runner is turned up slightly to prevent its catching in the ground. The chamber $a'$ is formed upon the forward end of the runner, which opens rearwardly to admit the end of a fender B and a rod C. The front end of this fender and rod are pivoted together within the chamber and are movably held therein by cross-pins $b$ and $c$, respectively. These pins may be provided with sleeves, if desired, to reduce friction. The rod C extends rearwardly through the runner and is fixed to a plate D.

Any preferred number of dislodgers may be attached to a reaper and their rods be secured to the plate D, by which they are moved in unison. The plate D is moved forward and back by a lever E, fulcrumed at $e$ on the reaper-platform L and connected to the plate B by rods $f\,f$. The platform L is of any preferred form and is shown fragmentarily in the drawings. It is evident that when the plate D is pushed forward the rear part of the fender B will be depressed by the rod C and that when the rod is drawn backward the fender will be raised by its contact with the pin $b$.

H is a vertical extension of the runner, secured thereon by bolts $i\,i$, its upper edge presenting a curve similar to that of the fender. Its rear end is provided with a chamber $h$ to admit the point of the guard G. It is really an auxiliary fender to prevent the grain-stalks from clogging the guards and sickle and may be left off when desired.

The fender B is bifurcated and has a bolt K or some equivalent means to adjust its prongs, which are resilient and normally spread apart.

Having now described my invention, what I claim is—

1. A grain-dislodger consisting in a runner attachable to a reaper, a chamber in the front part of the runner, a fender and a rod, having their front ends pivoted together and movably held within said chamber, pins to retain the ends of said rod and fender in the chamber, and means to actuate said rod and thereby to raise and lower said fender, substantially as described.

2. A grain-dislodger consisting in a runner attachable to a reaper, a chamber $a'$ on the front part in the runner, a fender and a rod having their front ends pivoted together and movably held within said chamber $a'$, pins to retain the ends of said rod and fender in said chamber $a'$, a curved vertical extension on the middle part of the runner, a chamber $h$, in said extension adapted to receive the point of a guard-finger and means to actuate said rod and thereby to raise and lower said fender as herein described.

3. A grain-dislodger consisting in a runner attachable to a reaper, an upwardly-curved point on the runner, a chamber in the front part of the runner, a fender and a rod having their forward ends pivoted together and movably held within said chamber, cross-pins to hold said rod and fender in the chamber, a plate connected to said rod and movable forward and backward, and a lever on the reaper to actuate said plate, as herein described.

In testimony whereof I affix my signature in presence of two witnesses.

HENRY E. KOCH.

Witnesses:
W. H. MARTIN,
R. F. KOCH.